Aug. 4, 1959  C. S. HULTON ET AL  2,897,601
METHOD AND MEANS FOR OBTAINING HIGH MOISTURE REMOVAL
Filed April 6, 1956  3 Sheets-Sheet 1

INVENTORS
Charles S. Hulton
Carl W. Mullenhagen
Roger G. Wiedenbein
BY
Murray, Sackhoff + Murray
ATT'YS

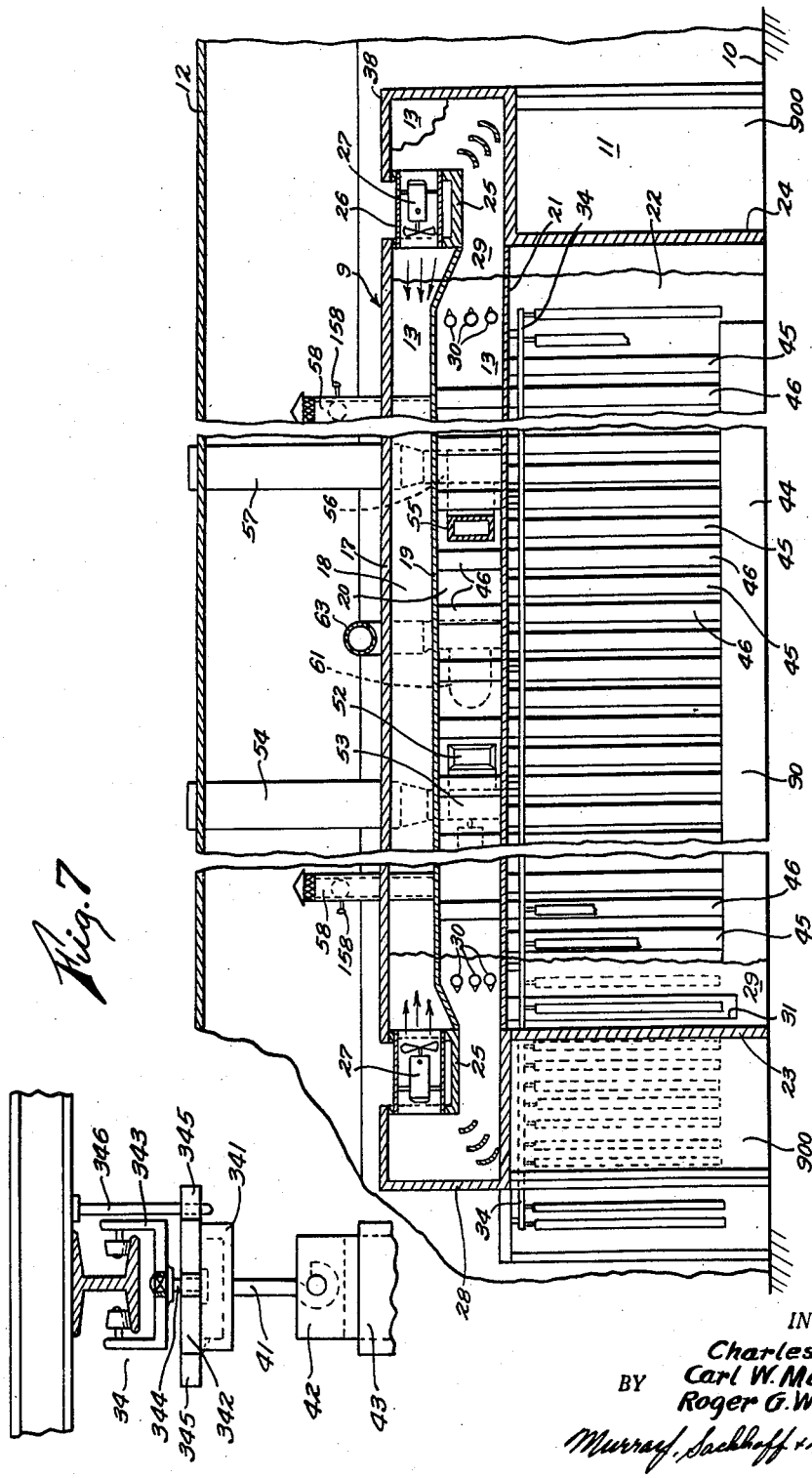

Aug. 4, 1959 — C. S. HULTON ET AL — 2,897,601
METHOD AND MEANS FOR OBTAINING HIGH MOISTURE REMOVAL
Filed April 6, 1956 — 3 Sheets-Sheet 3
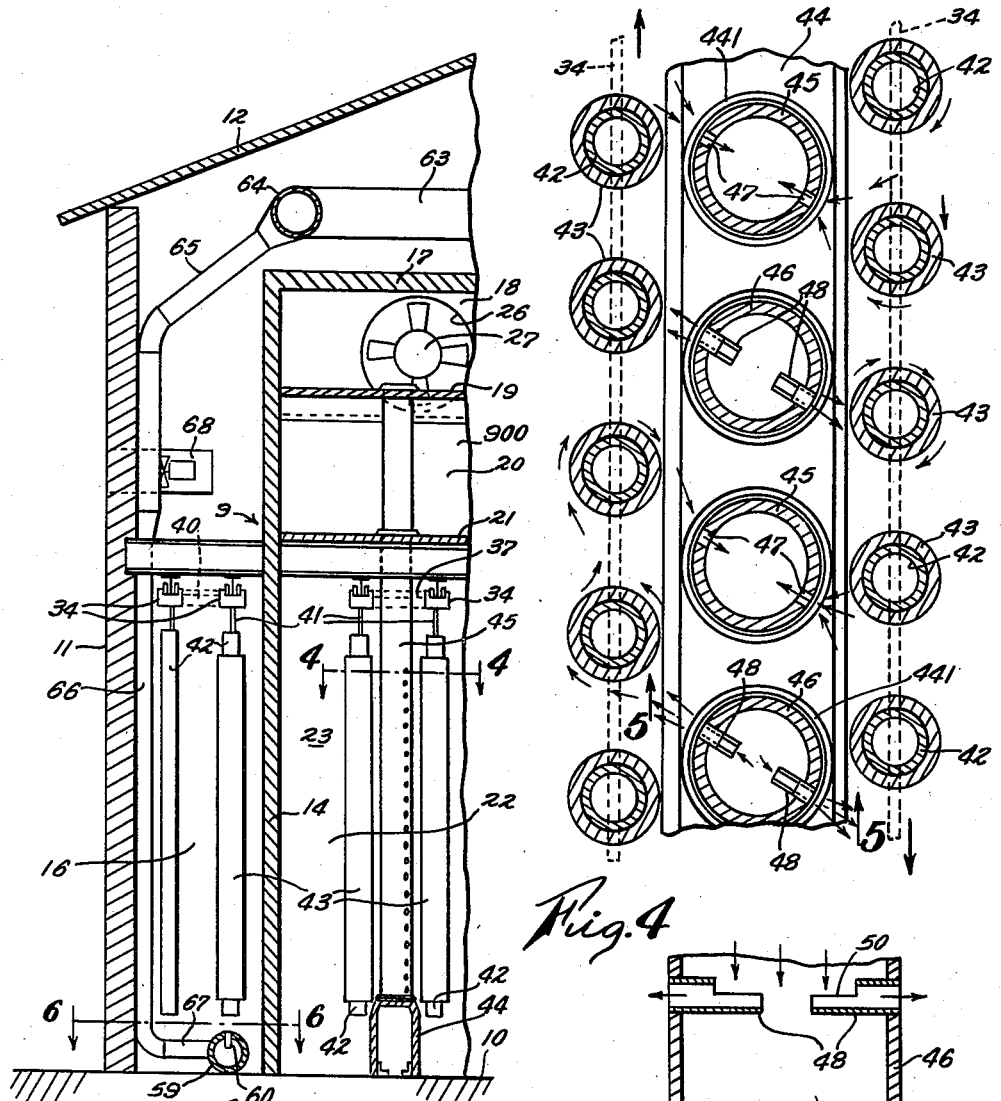
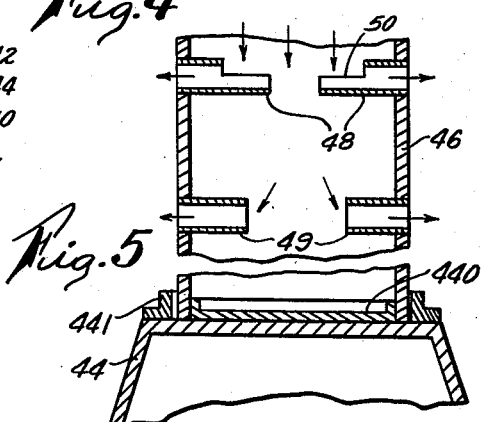
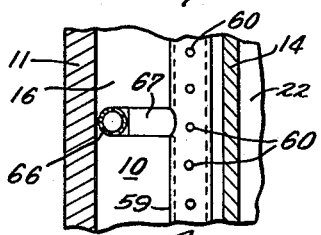
INVENTORS
Charles S. Hulton
Carl W. Mullenhagen
Roger G. Wiedenbein
BY
ATT'YS

2,897,601

METHOD AND MEANS FOR OBTAINING HIGH MOISTURE REMOVAL

Charles S. Hulton, Carl W. Mullenhagen, and Roger G. Wiedenbein, Cincinnati, Ohio, assignors to The Kirk & Blum Manufacturing Company, Cincinnati, Ohio, a corporation of Ohio Application April 6, 1956, Serial No. 576,719

9 Claims. (Cl. 34—21)

The present invention relates to moisture removal methods and means, and is particularly concerned with high moisture removal from articles that require careful drying.

Hollow articles such as fiber tube bodies have been produced by rolling wet continuous fiber pulp sheet stock, as formed by suitable paper making machines, onto a mandrel in a sufficient number of layers to form a tube of desired wall thickness and subjecting the tube to drying. By properly drying the tubes the surface fibers on the faces of the superposed layers remain intermeshed and bond the superposed layers of the tube wall together as an integral unit of the same strong and uniformly porous texture as the interior portions of the layers themselves. The dry tubes are intended to be thoroughly impregnated with a suitable composition material so that the walls are homogeneous, water tight and suitably resistant. These are cut and machined to form sewer pipe or conduit sections with tapered self-sealing joints when connected together in the ground.

Heretofore practiced drying methods with previously available moisture removal apparatus have been slow, and in the case of tubes having a wall thickness in excess of $\frac{3}{16}''$ considerable difficulty has been encountered as a result of delamination or separations of the layers within the tube wall. The continuous application of increased temperatures to hasten the drying also fosters delamination and may scorch or render the fibers too hard and brittle and may require the application of moisture to the tubes during the drying operation. The faults resulting from improper drying may be concealed faults that become apparent only during machining of the impregnated tubes at the factory or in the field.

Accordingly it is among the objects of the present invention to provide a highly efficient moisture removal method and means for drying products of a critical nature, such as the aforementioned tubes, to a selected high degree of moisture removal in a faster and safer manner so that superior tubes may be produced uniformly and less expensively.

The method of the invention includes the impingement of the outer face only of the tube with velocity streams of heated air at spaced intervals along the length of the tube in a direction such that the air streams flow around the outer circumferential surface of the tube to take away the surface moisture rapidly. These tubes are carried by the smooth tubular mandrels on which they are formed so that the inner circumferential surface cannot lose moisture except by yielding excess moisture to the wall structure in a radially outward direction as a replacement for the moisture removed by the heated, velocity air streams which continue to impinge and travel over the outer circumferential surface of the tube. The excess moisture that was initially carried in the interstices or pores between the saturated fibers will readily flow to the outer circumference of the tube wall and be continuously removed from the surface pores without permitting the surface fibers to become dry and hard.

Thus the superposed laminations of the initially very wet fiber pulp sheet remain interlocked or unified just as they were before the drying operation began when the pores and interstices between the saturated fibers were waterfilled. These interstices eventually give up all excess water in the direction of the surface of the outer tube face before the water of saturation in the fibers is lost so that a very porous unitary tube wall of still moist fibers remains and the moisture of absorption is gradually liberated through the pores and by absorption to the relatively drier outer fibers from those further inside the body wall of the tube. As the fibers lose their water of absorption they begin to curl and interlock uniformly throughout the thickness of the wall so that there is no tendency to separation or delamination between the original layers.

The velocity air streams for moisture removal are kept at a constant temperature somewhat above the scorching temperature of the fibers, the air from the individual streams being quickly removed locally, closely adjacent the points of issue, as soon as it has had its passage over the circumference of one or possibly two closely adjacent, moving tubes to take up surface moisture without scorching the fibers. The locally evacuated air is combined at a point non-adjacent the tubes. Some of this combined mass of moisture laden air is removed continuously and is replaced with drier fresh air so that the mass still contains some moisture and some heat. It is then reheated and is subsequently placed under pressure for delivery to the tube bodies as velocity streams of heated air which are capable of taking up further moisture from the faces of the tubes impinged thereby.

The preferred apparatus for carrying out the method of the invention comprises a suitable insulated drying chamber with a conveyor traveling into one end thereof from an external loading station, where the mandrels, with the newly wound, soft, wet, laminated tubes thereon, are vertically suspended in closely spaced relation on the conveyor and are carried into and through the chamber wherein the tubes are continuously and intermittently subjected to vertical rows of heated air blasts and to the exhaust of the moisture laden air into local exhaust ports closely adjacent the velocity heated air blasts during travel for a predetermined distance, following which the mandrels with the dried tubes thereon pass through an externally located cooling zone to an unloading station for removal of the tubes from the mandrels. The empty mandrels may preferably, but not necessarily, again pass through the cooling zone to a point relatively near the loading station where the mandrels are replaced with other mandrels carrying the newly wound, wet fibrous material in the form of tubes to be dried. As will be hereinafter set forth the drying chamber may be divided into sections that are separately controlled as to the supply of heated air blasts and air evacuation during the travel of the tubes through both sections.

In the ensuing detailed description of the preferred exemplification of the apparatus of the invention, reference is made to the accompanying drawings forming part of this application, and in which:

Fig. 2 is a cross sectional view taken on line 2—2 of Fig. 1.

Fig. 3 is a cross sectional view taken on line 3—3 of Fig. 1.

Fig. 4 is an enlarged cross sectional view taken on line 4—4 of Fig. 3.

Fig. 5 is a further enlarged cross sectional view taken on line 5—5 of Fig. 4.

Fig. 6 is a cross sectional view taken on line 6—6 of Fig. 3.

Fig. 7 is an enlarged detail of the hanger mechanism for the tube conveyor.

Figure 1:
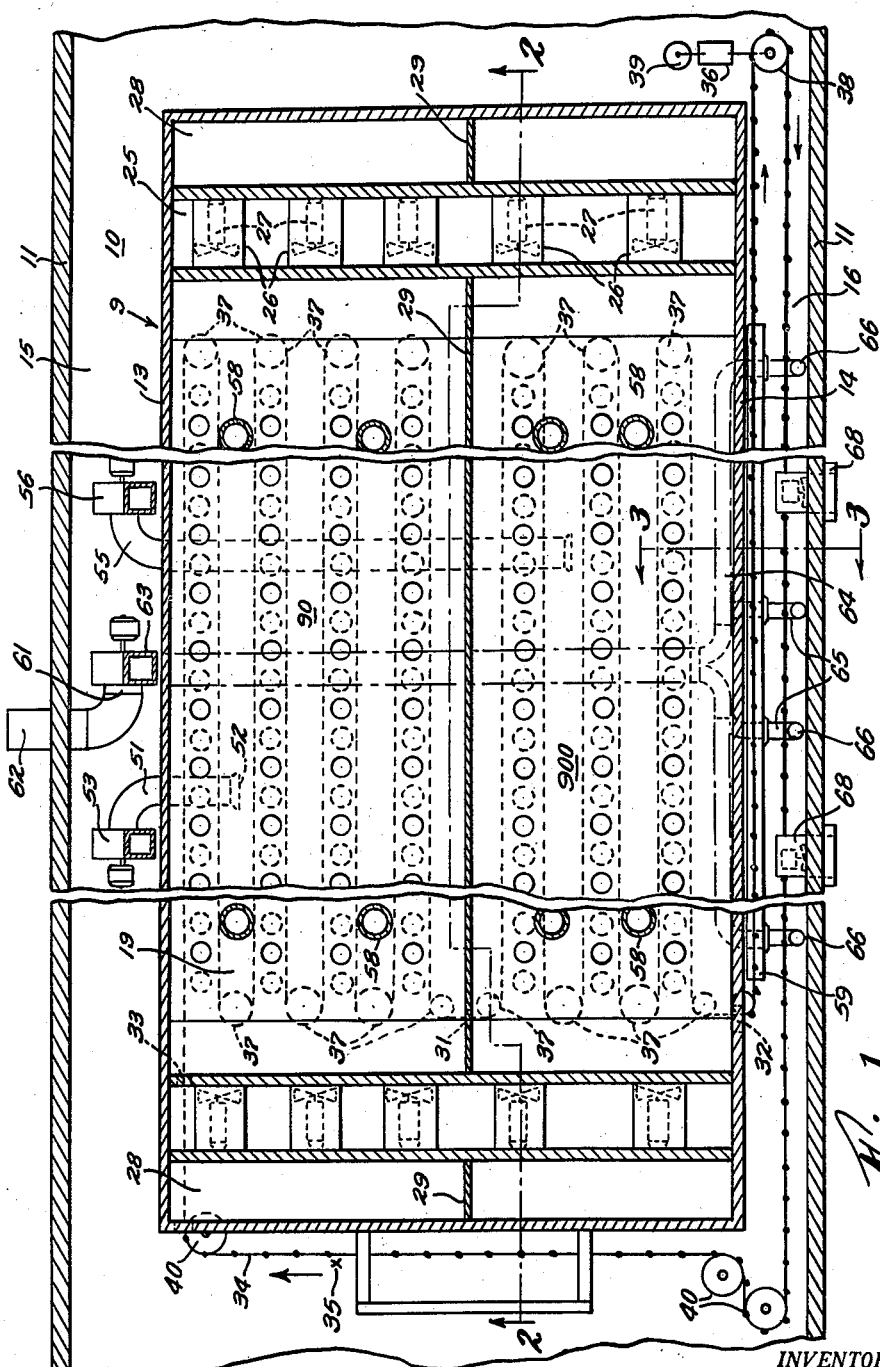
Fig. 1 is a horizontal sectional view through the upper portion of a building and an insulated enclosure therein and showing the interior of a hot air plenum supply chamber of the apparatus of the invention.

Referring to the drawings, an elongated insulated enclosure or housing 9 is erected on the floor 10 and between the side walls 11 and under the roof 12 of a suitable building. The housing 9 has longitudinal side walls 13 and 14 in spaced parallelism with the building side walls 11 to form a corridor 15 on one side and a relatively narrow cooling zone that takes the form of a tunnel or passage 16 at the opposite side. A flat insulating top 17 connects the upper ends of walls 13 and 14 and forms the top of a hot air plenum supply chamber 18. A horizontal metal diaphragm 19 extends in spaced parallelism below top 17 and between side walls 13 and 14 and forms the bottom of chamber 18 and the top of a chamber 20 which is a plenum exhaust or air return chamber.

A second horizontal metal diaphragm 21 is spaced in parallelism below diaphragm 19 and serves as a bottom for the chamber 20 and as a ceiling for a moisture removal or drying chamber 22. The end walls 23 and 24 extend from the building floor 10 vertically to the level of diaphragm 21 and then extend horizontally outwardly and upwardly again as an overhanging, inverted L-shaped end for the housing 9.

As can be best seen in Figs. 1 and 2 there is an open topped, transverse, trough-shaped structure 25 extending across the opposite ends of supply chamber 18 and the opposite sides of structure 25 serve to receive the opposite ends of tubular members 26, each containing a motor driven fan 27 for delivering air into the ends of chamber 18 from hollow L-shaped extensions 28 at the ends of chamber 20.

It will be noted that air plenum supply chamber 18 is of lesser height than plenum exhaust chamber 20, and as shown in Fig. 2, the ends of diaphragm 19 are inclined downwardly and connected to the adjacent bottom corners of the troughs 25.

In the present embodiment, the entire interior of housing 9 is longitudinally divided by a vertical partition 29 of sheet metal into unequal sections 90 and 900 from top 17 to floor 10 so that the chambers 18, 20 and 22 are correspondingly divided. Separate series of vertically spaced, horizontally extending heaters 30 such as gas heaters are arranged in each end of each section 90 and 900 of exhaust chamber 20 for heating the air as it is drawn beneath the adjacent trough 25 and up into and through the tubular members 26 and charged by the fans 27 therein into the ends of the corresponding section of chamber 18. The fans 27 and the heaters 30 on either side of partition 29 may be operated jointly or severally for carrying on the drying operation in the corresponding sections of drying chamber 22 although the tubes to be dried are arranged to travel through both of said sections. In this manner the amount of drying may be regulated with respect to the wall thickness of the tubes that are being dried at the time.

Reference is made to Fig. 2 where the fragmental portion of partition 29, adjacent end wall 23, is provided with an elongated vertical slot 31 that provides the sole communication between the two sections of drying chamber 22. Slot 31 is relatively narrow and extends from ceiling diaphragm 21 to a level at or closely adjacent floor 10. The side wall 14 has a similar exit slot 32 opposite said slot 31. The end wall 23 also has a similar entry slot 33 therein immediately adjacent the side wall 13, see Fig. 1.

At a level immediately below the ceiling 21 of the drying chamber 22 is a suitably supported horizontal endless conveyor, indicated by the reference numeral 34 and arranged to travel from an exterior loading point 35 through entry slot 33 into one section 90 of the drying chamber 22 wherein it follows an elongated, serpentine path before passing through communicating slot 31 in partition 29 into the next section 900 of said drying chamber and follows a similar serpentine path of fewer reaches until it passes through exit slot 32 outside the drying chamber 22 and travels along the outside of wall 14 through the cooling zone 16 to an unloading station 36 where it turns and may again pass through said cooling zone on its way to the said loading point 35.

As can be readily understood from the dotted lines showing in Fig. 1 the chain conveyor travel in the sections of drying chamber 22 is effected by means of a series of sprockets 37 while the external travel of the conveyor is effected by an externally located drive sprocket 38 which is powered by a suitable motor and speed reducer unit 39. Additional sprockets 40 complete the external path of the conveyor 34 back to the loading point 35 and into the chamber 22.

The conveyor 34 has depending hooks or the like 41 (Figs. 3 and 7) arranged at closely spaced intervals throughout its length to removably connect with the tops of tubular mandrels 42 on which the wet laminated tube bodies 43 are formed and carried from loading point 35 to the unloading station 36, and the empty mandrels are returned and replaced with freshly loaded mandrels at and adjacent said loading point 35. With particular reference to Fig. 7 the hook 41 is shown as preferably fixed to and depending from a mounting member 341 which has a star wheel or spider 342 secured thereto. This member is rotatably supported by a carrier link 343 of the conveyor on a swivel connection 344. The star wheel may have four radial arms 345 or a multiple thereof which successively contact a different abutment 346 spaced along the path of travel of the conveyor as it passes along through the oven proper, causes intermittent, partial rotation of the tubes around their centers to insure presentation of different tube surface portions of the air blasts to get more uniform drying and the consequent increase in the drying rate of the material of the tubes.

Secured to floor 10, inside the chamber 22, are elongated bases 44 that extend between and parallel to adjacent rows of the depending mandrels 42 as they are moved alternately in opposite directions in chamber 22; as can be seen, for example, in Figs. 3 and 4. The height of the bases 44 is such that the lower ends of mandrels 42 depend below the top wall of the base 44, and the sides of the base are tapered near the top so that the lower ends of the tubes 43 may also depend below the top of the base, if desired, without contacting it as they are carried in one direction along one side of the base and then in the opposite direction along the other side of the base and then repeat the back and forth travel about the next adjacent base. Each base 44 supports the bottom ends of a row of vertical stand pipes comprising alternate exhaust risers 45 and supply risers 46 shown in detail in Figs. 4 and 5; the bottom ends of said pipes being closed off by a head or disc 440 secured interiorly thereof. The lower end of each pipe rests upon the base within an angle iron ring 441 spot welded or otherwise secured to the flat top wall of the base. This arrangement provides a firm support for the pipes which permit rotation of the pipes in the rings to vary the angularity of heated air discharge and air exhaust relative to the line of travel of the tubes.

As can be seen in Fig. 2 the supply risers 46 extend upwardly through non-binding holes in the ceiling 21 and through the exhaust chamber 20 and have their open top ends in communication with the bottom interior of chamber 18 after passing through non-binding holes formed in the diaphragm 19. The exhaust risers 45 pass through non-binding holes in the diaphragm or ceiling 21 and communicate with the bottom interior of exhaust chamber 20. Each of the risers or stand pipes 45 and 46 is provided with a perforated section, hereinafter described in detail, located between its bottom and a level below the tops of the mandrels. In each instance the perforations are in vertical lines along diametrically opposite sides of each riser. The common diameter on which opposed lines of perforations are centered is horizontal and preferably inclined at about an angle of 45° with respect to a vertical plane in which the center axes of all the risers in the row are located (see Fig. 4), it being understood that said angularity of the opposed lines of perforations can be individually varied by rotating particular pipes on their center axes to achieve maximum duration of contact between the heated supply air and the material to be dried and to control the supply air striking velocity on the tube surfaces. It will be seen that with continued exhaust of air from both ends of either or both sections 90 and 900 of the exhaust chamber 20 by fans 27 there will be produced a negative pressure inside all of the exhaust risers 45 in the corresponding section or sections of chamber 22. The vertical line of holes or ports 47 in exhaust risers 45 are adjustably arranged to withdraw air from the chamber 22 closely adjacent the line of moving mandrels in an angular direction across the path of travel of the mandrels and at many vertically spaced levels from the top to the bottom of the tubes 43 on the mandrels 42. The holes 47 may be of increasing area toward the bottom of risers 45 in order that substantially uniform amounts of air are taken in through each of the holes or ports and delivered to form a common or combined volume in chamber 20.

The supply risers 46 have vertical lines of horizontal jet orifices in diametrically opposed pairs and all of them are of equal diameter and formed by means of interiorly disposed jets 48 and 49 from each of which heated air, from chamber 18 and delivered under pressure to all of the supply risers, may issue at substantially uniform velocity and volume onto the passing tubes 43 in the direction of travel of said tubes. Each row of jets 48—49 in each riser 46 may include an extra orifice at each end, as compared to the number of exhaust holes 47 in the risers 46, so that chamber 22 is slightly pressurized locally and insures proper and efficient uniform evacuation of air through the exhaust holes 47 at lower power cost and with lighter weight risers 45 and 46.

It is contemplated that slightly more numerous jets 49 are used in the lower half of the riser 46 than jets 48 in the remaining top portion of the said riser. The jets 49 are cut off square at the free inner ends and these jets are shorter, say approximately one-third shorter, than jets 48. The jets 48 are notched or cut away approximately at their mid-length to form hemitubular scoops 50 to deflect a greater or lesser amount of air pressure through their respective orifices as the pressure air is charged into the tops of all of the risers 46 from the pressure chamber 18. It will be understood that the scoop portions 50 are rotatably adjusted to predetermined angular positions by turning the jets 48 before securing them in the riser 46. The properly arranged and adjusted jets 48 and 49 provide for substantially uniform velocity blasts or streams of heated air from all jet orifices from the top to the bottom of each supply riser.

As illustrated in Fig. 4 the succession of tubes 43 on the mandrels passing the alternate risers 45 and 46 are impinged on the outer face by the heated air blasts. The heated air streams tend to follow and wipe across the outer circumference of the tube wall rather than to be deflected from the tube wall. As the tubes successively enter and pass through the directional velocity air streams, the latter will impinge tangentially near the leading side of the tube and progressively across the tube to the trailing side of the tube. During the movement of the tube past the air stream the latter will follow the tube circumference with a changing pattern and may sweep at least partly about the adjacent tube ahead before losing its velocity and coming under the influence of the air flow into the intake hole or port in the adjacent exhaust riser. At the same time the tubes traveling along the opposite side of the row of risers are being subjected to the same type of air blasts and local air evacuations. It will also be readily understood that every tube on the conveyor is subjected to blasts from each riser twice as it pursues its serpentine travel in chamber 22. The heat of the air streams is maintained somewhat above the scorching point of 280° F. for the fiber material of the tubes from which the moisture is to be removed, e.g. around 340° F. The rate of movement of the particular tubes through the air blasts precludes temperature build-up in the surface fibers but causes a relatively quick and intermittent high temperature air wiping action on the surfaces of the tubes, as they pass the risers. The moisture laden exhaust air reaching chamber 20 retains a considerable amount of the original heat due to the rapid evacuation through the multiplicity of exhaust ports or holes 47 in risers 45 which remove the air of the heated blasts close to the points of issue.

The exhaust air returning to the two independent sections 90 and 900 of exhaust chamber 20 may be reconditioned as independent air bodies if both sections of chamber 20 and chamber 18 are in use at the same time, by removing like or unlike proportions of the several volumes and exhausting them to the outside atmosphere. For example a single exhaust conduit 51 has an open end 52 located in one section 90 of chamber 20 while the other end leads through side wall 13 into a separate power driven exhauster 53 located overhead in corridor 15, and discharges into a stack 54 that passes through roof 12. Another exhaust conduit 55 has its open end located in the remaining section 900 of chamber 20 and extends through partition 29, the first mentioned section 90 of chamber 20 and side wall 13 and connects with an exhauster 56 which discharges into a stack 57. Fresh air inlet stacks 58 are provided in both ends of each section of chamber 20 (see Figs. 1 and 2) and these pass down through top 17 and chamber 18 and deliver drier fresh air into the top of chamber 20 adjacent each of the batteries of heaters 30. The heaters 30, four in all, located respectively in each of the opposite ends of the two sections 90 and 900 of chamber 20, may be gas flame heaters supplied with pre-mixed fuel gas by individual gas pipes which may be subject to regulation and automatic control by any suitable valve control apparatus (not detailed) available in the market. The continuous recirculation of the air with the partial replacement in chamber 20 prior to restoring the desired delivery temperature may be maintained by the aforedescribed arrangement. The large air flow volume permits the use of a low temperature differential of possibly not over 100° F. The circulating heated air is not completely dry so that no external moisture need ever be introduced into the system when the wet material operated upon warrants the use of elevated operating temperatures.

After the tubes on the mandrels have been subjected to a high degree of moisture removal in safe and prime condition the conveyor carries them through exit slot 32 and into cooling zone 16 alongside wall 14. The mandrels and the tubes thereon remained relatively cool during the removal of the saturated water in the early stages of the drying operation, but, in the final drying stages, when the water of absorption in the fibers was progressively removed, the tube body was no longer subject to delamination and it became heated as did the mandrel carrying it. For the purpose of cooling each finished tube on its mandrel sufficiently to make the tube easily handled at the unloading station 36, a cooling air pressure plenum chest 59 is extended along the floor of the cooling zone 16 in a closely spaced relation to wall 14 and is in the form of a pipe which is located beneath the bottom ends of the loaded mandrels. The chest or pipe 59 has closed ends, and in the top thereof has a plurality of uniformly spaced, internally mounted jets 60 (see Figs. 3 and 6) which are substantially like the jets 49 in the risers 46. A power driven fan 61 located overhead in corridor 15 has an air intake 62 extending through the outside building wall 11 and delivers air into a trunk conduit 63. The trunk conduit extends over the top of the enclosure 9 and has branched conduits 64 and 65 which deliver the cooling air into a plurality of risers 66 that extend vertically along the building wall 11 and connect at floor level by means of the angularly directed sections 67 into the side of chest 59. The building wall 11 may have one or more selectively operated exhaust fans 68 for venting the spent cooling air from above the cooling tunnel 16 to the atmosphere whenever it is deemed desirable. Under certain conditions the spent and warmed cooling air may be permitted to rise to the open zone beneath the roof 12 and be taken in as pre-warmed replacement air through the fresh air inlet stacks 58, said stacks being equipped with manually operated volume dampers indicated by reference numeral 158 in Fig. 2.

The operation of the apparatus will be readily understood from the foregoing. It will be appreciated that the tubes 43 pass through the chamber 22 in a very long serpentine path and are twice subjected to the blasts from each supply riser that is in use at the time. The period of time required to dry the thinner walled tubes is of the order of one third shorter than required to dry such tubes by previously known and used methods and means. In addition to this increased rate of output, the tubes have been more safely dried and the wall structure is in optimum condition in strength and texture. There has been no need to apply added moisture to the tubes during the drying operation for protective reasons and notable overall economy in heat and power is realized.

In drying the heavier walled tubes, particularly greater than three-sixteenths of an inch wall thickness, a remarkable increase in the drying rate is effected, e.g. approximately a 45% to 50% increase in the rate. These thicker walled tubes had previously tended to delaminate or split away between the laminations and thus cause a considerable loss in faulty tube bodies.

The method of the invention which includes essentially the continuous removal of all moisture from the outer circumferential face of the tube while applying little or no heat to the mandrel in the process results in assured integral tube walls of uniform density and porosity with an apparently improved textural strength. The latter is believed to result from the fact that the continuous radially outward passage of all moisture in the wall to the outer circumference for removal tends to produce a directional and improved interlocking of the individual fibers throughout the thickness of the wall. The apparatus of the invention serves to carry out the method in a rapid, safe and very economical fashion.

What is claimed is:

1. The method of high moisture removal from wet laminated fiber tubes on mandrels on which they were formed, which includes the steps of repeatedly subjecting contiguous portions of the outer face of each tube to impingement by heated velocity air streams directed laterally against said face for taking moisture from said face only, evacuating the moisture containing air in closely adjacent lateral areas corresponding generally in number and volume to the several velocity streams while intermittently permitting the residual moisture in the tube body to redistribute itself in the direction of the tube face from which the moisture is removed and continuing said cycle to attain a desired low moisture content in the tube body, then cooling the tube and permitting the low retaining moisture of absorption in the fibers thereof to further redistribute to substantial uniformity throughout the tube wall, then removing the tube from the mandrel.

2. The method of high moisture removal from wet laminated fiber tubes on the mandrels on which they were formed, which includes suspending the mandrels vertically in closely spaced parallelism, repeatedly subjecting the outer face only of each tube to lateral impingement at close range by a plurality of vertically spaced heated velocity air streams and allowing the streams to follow the circumference of the tube and absorb surface moisture, removing the moisture laden air at substantially the same levels and adjacent the respective air streams while permitting the residual moisture in the tube wall to redistribute itself to replace moisture at the surface, continuing the air impingement and air evacuation to remove the desired amount of moisture from the tube, constantly combining the locally evacuated air in a common mass and reconditioning it by partial replacement with dry air and added heat for redistribution as impinging air streams on the tube body, and removing each tube from its mandrel after a selected interval of moisture removal.

3. The method of high moisture removal from wet laminated fiber articles on the mandrels on which they were formed, which comprises moving the mandrels progressively through an extended path in a confined chamber, subjecting the outer faces only of the articles to laterally directed intermittent multiple streams of heated velocity air and allowing the streams to sweep around the surface of one or more articles for removing moisture before losing its velocity, while intermittently permitting the residual moisture in the article to redistribute itself toward the surface where moisture was removed, constantly evacuating the moisture laden air in a plurality of lateral areas adjacent the several issuing heated velocity air streams to maintain a moderate temperature and a relatively lower moisture content in the atmosphere in the confined chamber, removing the mandrels with the articles thereon from the confined chamber and subjecting them to cooling air blasts and then removing the articles from the mandrels.

4. The method of high moisture removal from wet laminated fiber articles on the mandrels on which they were formed, which comprises moving the mandrels progressively through an extended path in a confined chamber, momentarily subjecting the outer faces only of the articles to intermittent multiple streams of velocity air heated to above the scorching temperature of the fibers of the articles and allowing the streams to sweep the surface of one or more articles for removing moisture before losing its velocity, repeatedly permitting the residual moisture in the article to redistribute itself toward the surface where moisture was removed, constantly evacuating the moisture laden air in a plurality of local areas adjacent the several issuing heated velocity air streams to maintain a moderate temperature and a relatively low moisture content in the atmosphere in the confined chamber, removing the mandrels with the articles thereon from the confined chamber and subjecting them to cooling air blasts and then removing the articles from the mandrels.

5. A moisture removal oven comprising a heat insulated enclosure having a drying chamber in the bottom thereof, a pair of vertically spaced diaphragms extending across the interior of the enclosure and providing an exhaust chamber and a supply chamber in the order named in superposed relation above the drying chamber, an endless conveyor in the top of the drying chamber immediately beneath the lowermost diaphragm and defining a serpentine path within the drying chamber and further having an external portion leading into and from the interior, the interiorly disposed portion of said conveyor comprising parallel reaches moving alternately in opposite directions, rows of vertical stand pipes arranged intermediate adjacent oppositely moving reaches of the conveyor, said stand pipes including alternate supply risers extending through the diaphragms and connecting in communicating relation with the bottom interior of the supply chamber and exhaust risers extending through the lowermost diaphragm and communicating with the bottom of the exhaust chamber, the supply risers having vertical rows of jet orifices arranged in diametrically opposed relation, the exhaust risers having vertical rows of exhaust ports therein, mandrels suspended from the conveyor for movement in the path of discharge of the supply jets and adapted to carry articles to be dried through the path of said jets at each side of the row of stand pipes, heaters at each end of the exhaust chamber, fan members effecting circulating communication between the adjacent ends of the exhaust and supply chambers, means to effect limited exhaust intermediate the ends of the exhaust chamber to the exterior of the insulating enclosure, and controlled fresh air intake for automatically replacing the last named controlled exhaust.

6. Moisture removal apparatus comprising an insulated enclosure having a vertical entry slot adjacent an end and a vertical exit slot adjacent an end, an endless conveyor having a portion thereof outside the enclosure and movable through the said entry and exit slots and an internal portion providing elongated serpentine path comprising parallel reaches moving alternately in opposite directions, rows of alternate supply and exhaust risers disposed intermediate each pair of alternately moving reaches of the conveyor, the supply risers having vertically spaced jet orifices at diametrically opposite sides, said exhaust risers having approximate corresponding series of exhaust orifices therein, means on the conveyor for moving vertically suspended mandrels, a diaphragm forming a ceiling for the chamber above the conveyor and the bottom of an exhaust chamber above said chamber, a second diaphragm vertically spaced from said ceiling and forming a top for the exhaust chamber and a bottom for the supply chamber, the supply risers having communication at the top ends with the bottom interior of the supply chamber, the exhaust risers having opened communication at their ends with the bottom interior of the exhaust chamber, means including fans for withdrawing air from the opposite ends of the exhaust chamber and delivering the same under pressure to the corresponding adjacent ends of the supply chamber, heaters in the opposite ends of the exhaust chamber whereby air circulated by said fans is heated prior to entry into the supply chamber, means intermediate the heaters for effecting partial replacement of the air content of the exhaust chamber, a cooling air plenum pipe extending horizontally beneath an external reach of said conveyor and having a series of cooling air jet orifices discharging vertically upwardly along the path of said external reach, means to supply cooling air at uniform pressure throughout said cooling air plenum pipe, means including the exterior of the insulating enclosure forming a cooling zone containing the cooling air plenum pipe and the reach above it, and exhaust fans to selectively vent the cooling zone.

7. A moisture removal oven comprising a drying chamber, an endless conveyor in the top of the drying chamber having parallel reaches moving alternately in opposite directions, rows of vertical stand pipes arranged intermediate adjacent oppositely moving reaches of the conveyor, means for rotatably supporting the stand pipes for individual adjustments around their vertical axes, means for introducing heated air under pressure into alternate stand pipes, means for creating negative pressure in the remaining stand pipes, all of said stand pipes having diametrically opposed, vertical rows of horizontally directed openings formed therethrough, and means for suspending the mandrels from the endless conveyor for movement in the horizontal paths of the openings in the stand pipes, said mandrels being adapted to carry hollow articles to be dried.

8. A moisture removal oven as set forth in claim 7 characterized by the fact that the means for rotatably supporting the stand pipes comprises a fixed base having a flat top wall upon which the lower ends of the stand pipes rest, an interiorly positioned head for closing off the end of each stand pipe and a ring fixed to the top wall and surrounding the lower end portion of each stand pipe.

9. A moisture removal oven comprising a drying chamber, an endless conveyor in the top of the drying chamber having parallel reaches moving alternately in opposite directions, rows of vertical stand pipes arranged intermediate adjacent oppositely moving reaches of the conveyor, means for rotatably supporting the stand pipes for individual adjustments around their vertical axes, means for introducing heated air under pressure into alternate stand pipes, means for creating negative pressure in the remaining stand pipes, all of said stand pipes having diametrically opposed, vertical rows of horizontally directed openings formed therethrough, rotatable means for suspending each mandrel from the endless conveyor for movement in the horizontal path of the openings in the stand pipes, and abutments located along the path of the endless conveyor for rotating the mandrel through a part of a revolution.

References Cited in the file of this patent
UNITED STATES PATENTS

| | | |
|---|---|---|
| 2,022,593 | Fuykers | Nov. 26, 1935 |
| 2,200,100 | Sachtleben | May 7, 1940 |
| 2,355,814 | Mayer | Aug. 15, 1944 |
| 2,385,962 | Barnett | Oct. 2, 1945 |
| 2,532,494 | Hensler | Dec. 5, 1950 |
| 2,724,189 | Ewing et al. | Nov. 22, 1955 |